(12) United States Patent
Torres (10) Patent No.: US 10,518,433 B2
(45) Date of Patent: Dec. 31, 2019

(54) SAW TABLE SYSTEM (71) Applicant: Ramiro Torres, Willis, TX (US)

(72) Inventor: Ramiro Torres, Willis, TX (US)

( * ) Notice: Subject to any disclaimer, the term of this patent is extended or adjusted under 35 U.S.C. 154(b) by 0 days.

(21) Appl. No.: 15/891,181

(22) Filed: Feb. 7, 2018

(65) Prior Publication Data

US 2019/0240858 A1 Aug. 8, 2019

(51) Int. Cl.
| | |
|---|---|
| *B27B 5/29* | (2006.01) |
| *B27B 5/20* | (2006.01) |
| *F16M 11/38* | (2006.01) |
| *F16M 11/42* | (2006.01) |
| *B25H 1/04* | (2006.01) |
| *B23D 47/02* | (2006.01) |
| *A47B 3/083* | (2006.01) |

(52) U.S. Cl.
CPC ............... *B27B 5/29* (2013.01); *B27B 5/206* (2013.01); *A47B 3/083* (2013.01); *B23D 47/025* (2013.01); *B25H 1/04* (2013.01); *F16M 11/38* (2013.01); *F16M 11/42* (2013.01)

(58) Field of Classification Search
CPC .......... B25H 1/04; B25H 1/14; B25H 1/0035; B23D 47/025; A47B 3/083; A47B 1/03; A47B 1/10; A47B 2001/035; F16M 11/38; F16M 11/42; B27B 5/16; B27B 5/185; B27B 5/29; B27B 5/206; Y10T 83/7722; Y10T 83/7697; Y10T 83/8773
USPC .............. 144/286.5, 287; 83/477, 471.3, 581
See application file for complete search history.

(56) References Cited

U.S. PATENT DOCUMENTS

| | | | | | |
|---|---|---|---|---|---|
| 4,561,336 | A | * | 12/1985 | Davis | B23Q 1/03 144/286.1 |
| 4,974,651 | A | * | 12/1990 | Carmon | B23D 47/025 144/286.1 |
| 5,004,029 | A | * | 4/1991 | Garner | B23D 47/025 108/101 |
| 5,087,013 | A | * | 2/1992 | Gress | B23Q 9/00 248/129 |
| 5,320,150 | A | * | 6/1994 | Everts | B23D 47/025 108/179 |
| 5,526,856 | A | * | 6/1996 | Pedri | B23D 47/025 144/286.1 |
| 5,839,339 | A | | 11/1998 | Sasaki et al. | |
| 5,862,732 | A | | 1/1999 | Itzov | |
| 6,152,462 | A | * | 11/2000 | Barrett | B25H 1/04 280/30 |

(Continued)

FOREIGN PATENT DOCUMENTS

WO    WO2005102626    11/2005

*Primary Examiner* — Evan H MacFarlane (57) ABSTRACT

A saw table system includes a stand that is positioned on a support surface. A table is coupled to the stand and the table is configured to be spaced from the support surface when the stand is positioned in the unfolded position. A miter saw is positioned on the table for cutting a member and the miter saw has a cutting length of at least 24.0 inches. A pair of extension units is provided and each of the extension units is movably coupled to the table. Each of the extension units has a width of at least 24.0 inches. Each of the extension units is selectively positioned in a deployed position having each of the extension units being laterally spaced from the table. In this way the pair of extension units may support a member that is too long for the table to support.

7 Claims, 5 Drawing Sheets

(56) References Cited

U.S. PATENT DOCUMENTS

| | | | | |
|---|---|---|---|---|
| 6,240,987 B1* | 6/2001 | Birkeland | ................ | B25H 1/04 |
| | | | | 108/69 |
| 6,550,363 B2* | 4/2003 | He | ...................... | B23D 45/048 |
| | | | | 83/471.3 |
| 6,672,348 B2* | 1/2004 | Ransom | ............... | B23D 47/025 |
| | | | | 144/286.5 |
| D513,271 S | 12/2005 | Ozawa et al. | | |
| 7,228,775 B2 | 6/2007 | Wang | | |
| 7,487,947 B2* | 2/2009 | Liu | ......................... | B25H 1/04 |
| | | | | 248/284.1 |
| 7,926,523 B2* | 4/2011 | Williams | ................. | B25H 1/10 |
| | | | | 144/286.5 |
| 8,025,001 B2 | 9/2011 | Chen et al. | | |
| 8,607,680 B1 | 12/2013 | Carr | | |
| 9,327,355 B2* | 5/2016 | Struss | .................. | B23D 47/025 |
| 10,017,093 B1* | 7/2018 | Murphy | .................. | B66F 7/065 |
| 2005/0217446 A1* | 10/2005 | Brazell | ................ | B23D 47/025 |
| | | | | 83/477.2 |
| 2006/0038383 A1* | 2/2006 | Wu | .......................... | B25H 1/04 |
| | | | | 280/652 |
| 2009/0007987 A1* | 1/2009 | Thomas | ............... | B23D 47/025 |
| | | | | 144/286.1 |

* cited by examiner

SAW TABLE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98.

The disclosure and prior art relates to extension devices and more particularly pertains to a new extension device for supporting lumber for cutting with a saw.

BRIEF SUMMARY OF THE INVENTION

An embodiment of the disclosure meets the needs presented above by generally comprising a stand that is positioned on a support surface. A table is coupled to the stand and the table is configured to be spaced from the support surface when the stand is positioned in the unfolded position. A miter saw is positioned on the table for cutting a member and the miter saw has a cutting length of at least 24.0 inches. A pair of extension units is provided and each of the extension units is movably coupled to the table. Each of the extension units has a width of at least 24.0 inches. Each of the extension units is selectively positioned in a deployed position having each of the extension units being laterally spaced from the table. In this way the pair of extension units may support a member that is too long for the table to support.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
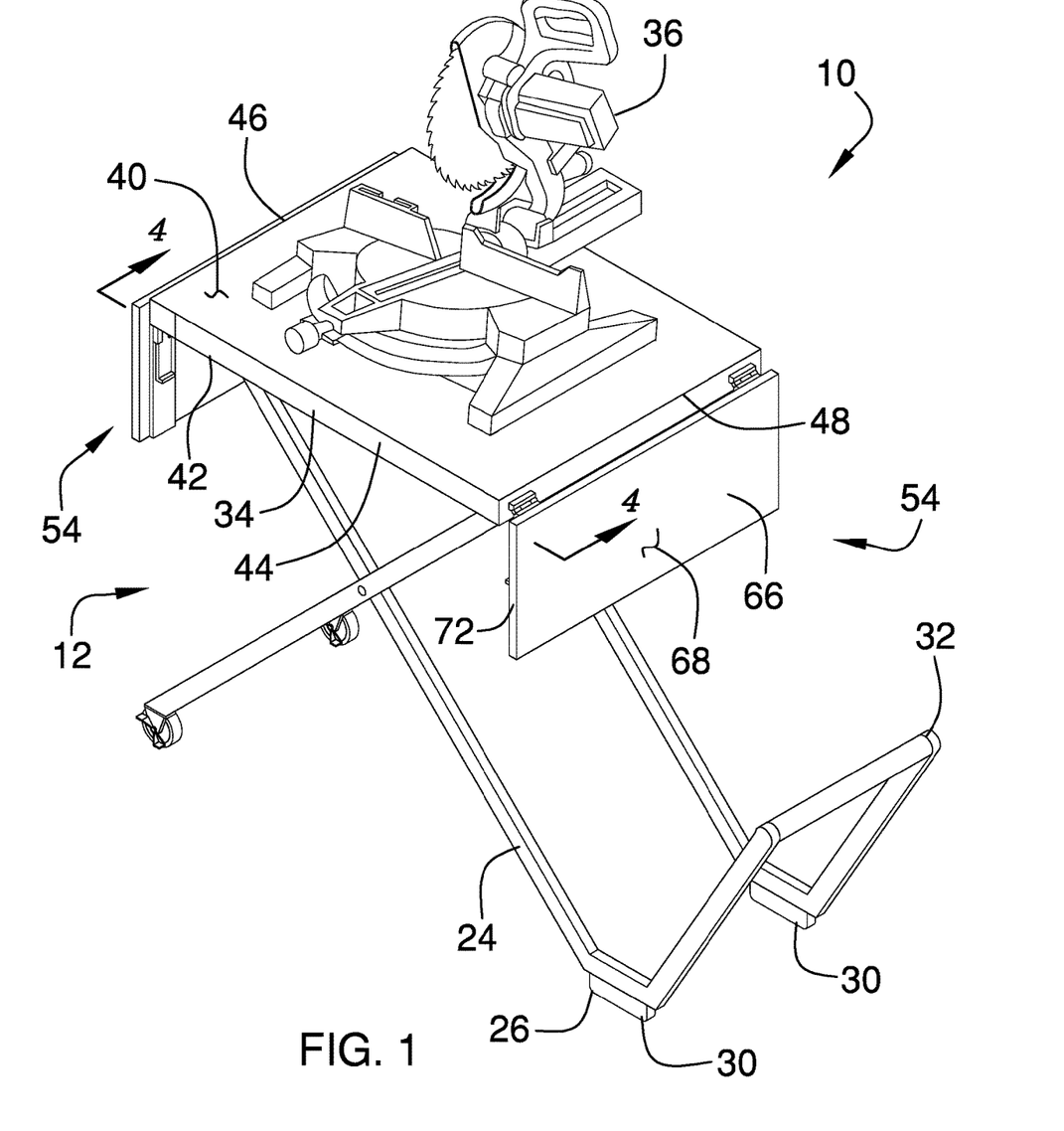
FIG. 1 is a top perspective view of a saw table system according to an embodiment of the disclosure.
Figure 2:
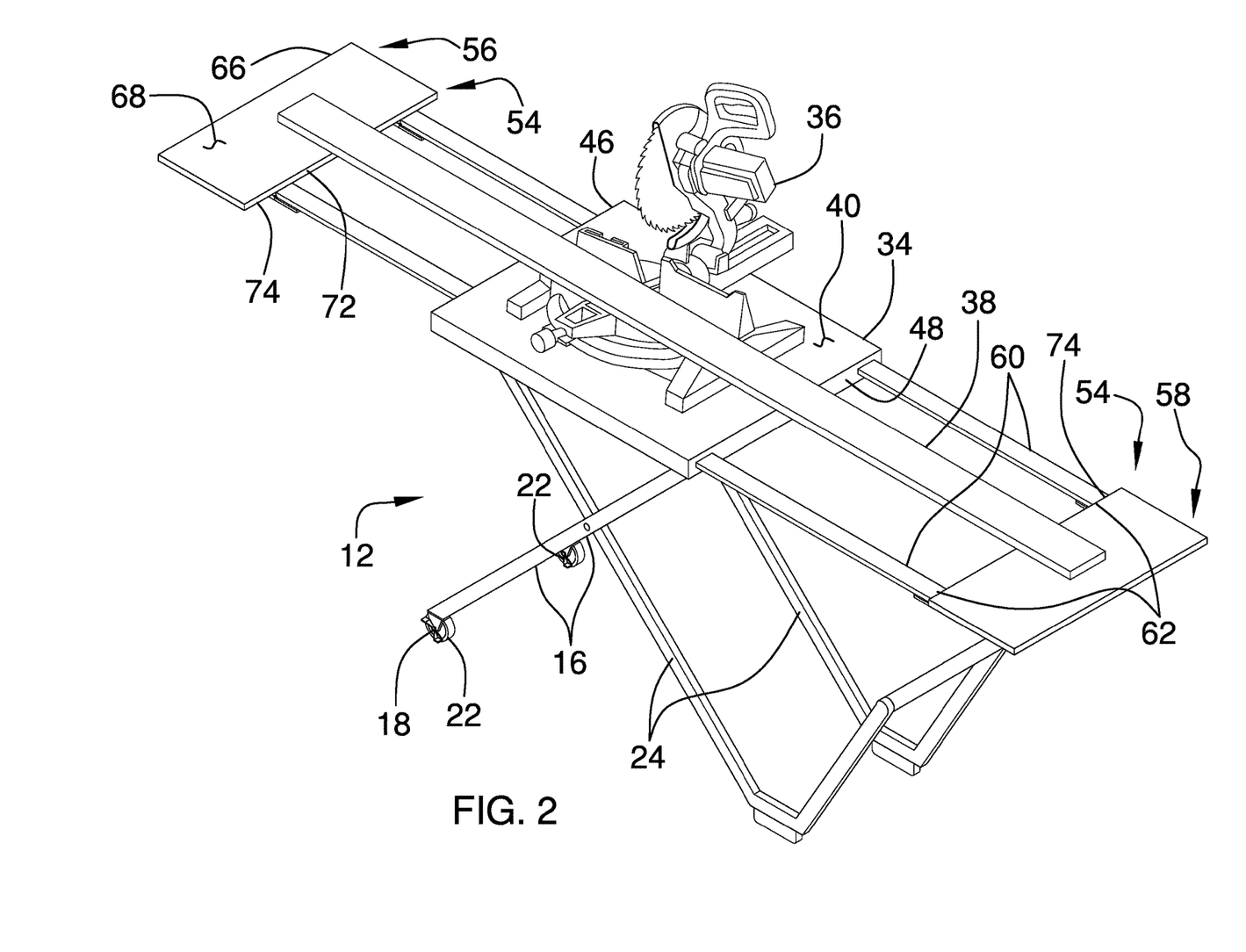
FIG. 2 is a perspective view of an embodiment of the disclosure showing a pair of extension units in a deployed position.
Figure 3:
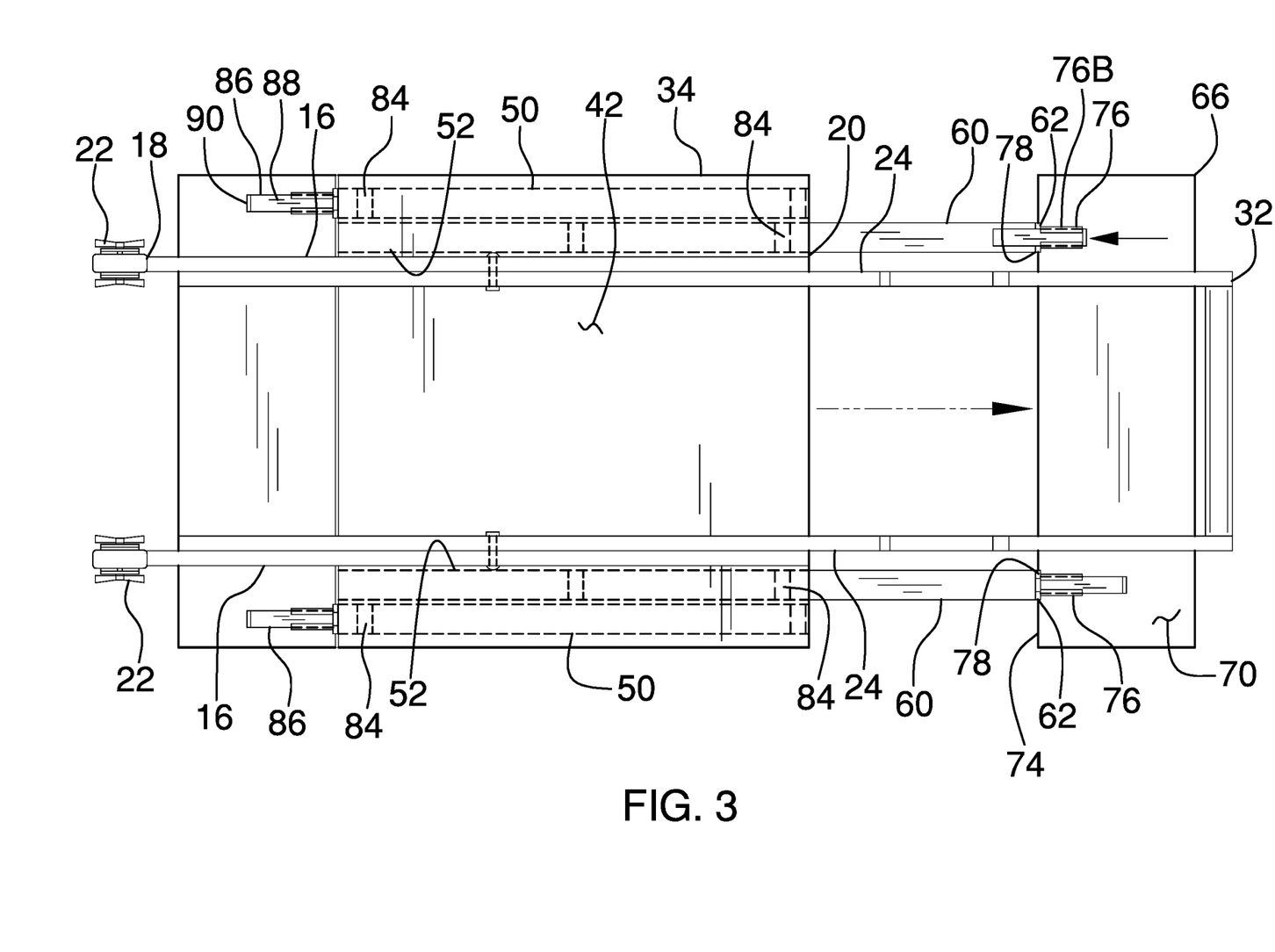
FIG. 3 is a bottom phantom view of an embodiment of the disclosure.
Figure 4:
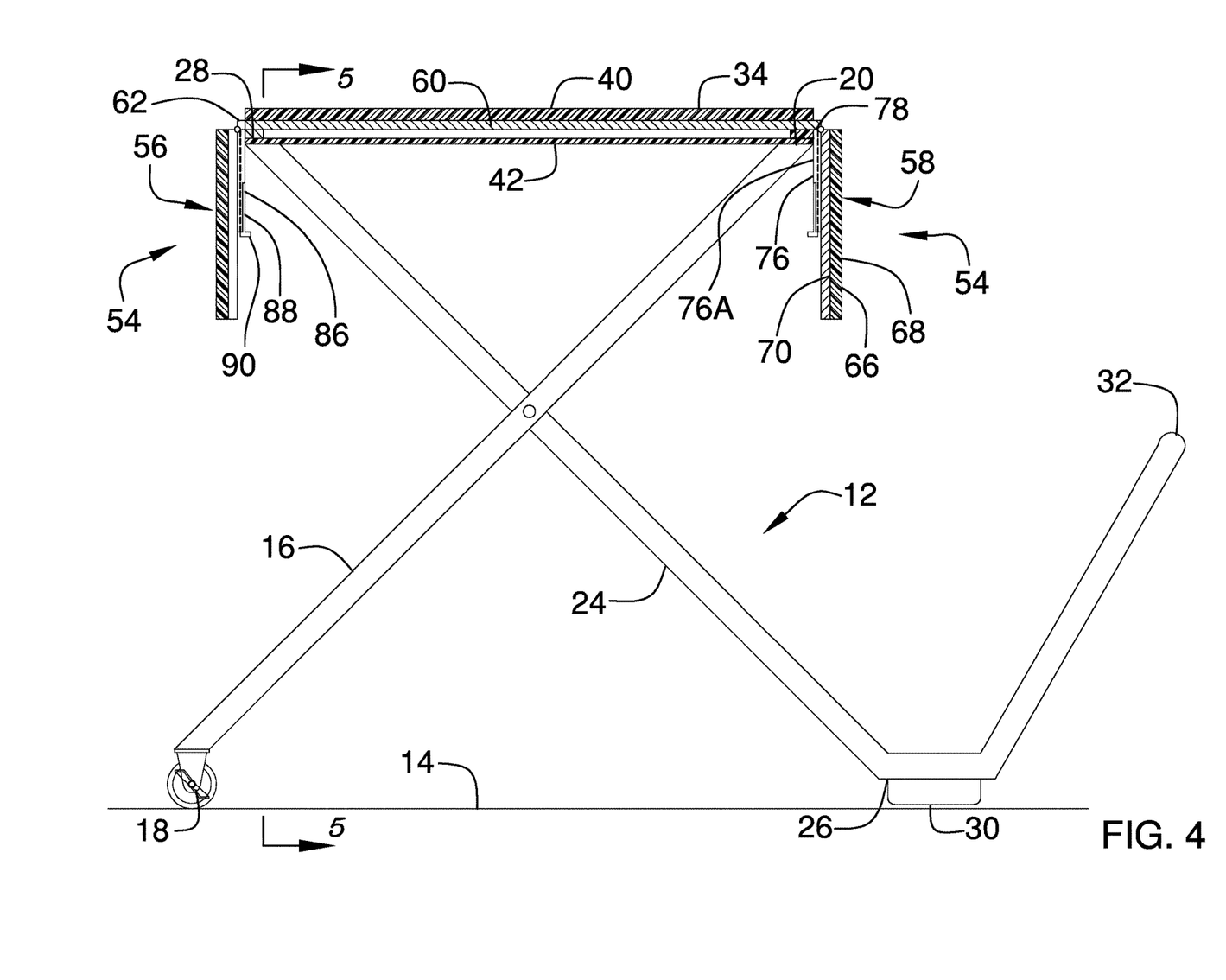
FIG. 4 is a cross sectional view taken along line 4-4 of FIG. 1 of an embodiment of the disclosure.
Figure 5:
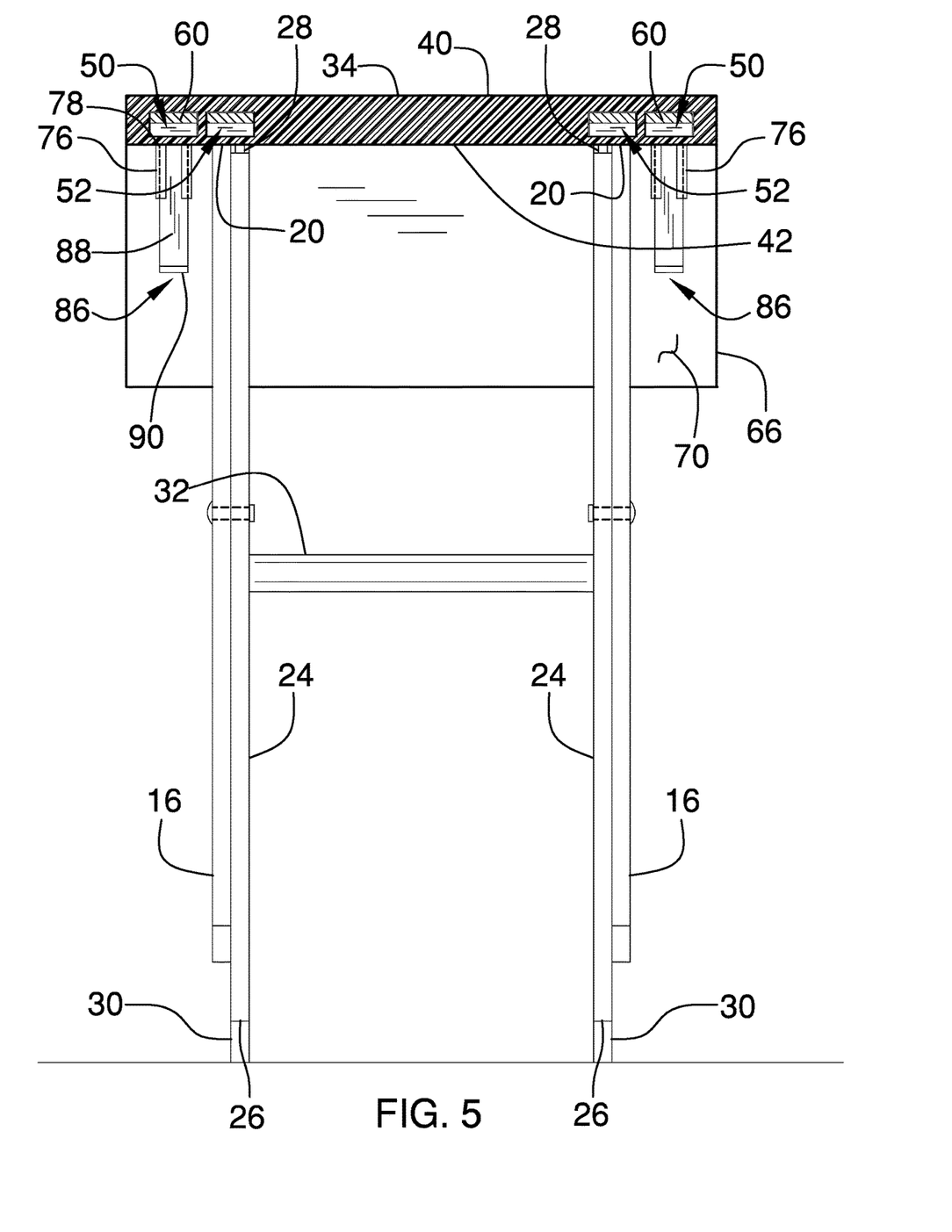
FIG. 5 is a cross sectional view taken along line 5-5 of FIG. 4 of an embodiment of the disclosure.

With reference now to the drawings, and in particular to FIGS. 1 through 5 thereof, a new extension device embodying the principles and concepts of an embodiment of the disclosure and generally designated by the reference numeral 10 will be described.

As best illustrated in FIGS. 1 through 5, the saw table system 10 generally comprises a stand 12 that is positioned on a support surface 14 such as ground or the like. The stand 12 is selectively positioned between a folded position and an unfolded position. The stand 12 comprises a pair of first legs 16, each having a first end 18 and a second end 20. A pair of wheels 22 is provided and each of the wheels 22 is rotatably coupled to the first end 18 of an associated one of the first legs 16. Moreover, each of the wheels 22 selectively rolls on the support surface 14.

The stand 12 includes a pair of second legs 24, each having a first end 26 and a second end 28. Each of the second legs 24 is pivotally coupled to an associated one of the first legs 16. Additionally, each of the first legs 16 and the second legs 24 forms an X when the stand 12 is positioned in the unfolded position. In this way the second end 20,28 corresponding to each of the first 16 and second 24 legs is spaced from the support surface 14. Each of the first legs 16 is oriented to be coextensive with the second legs 24 when the stand 12 is positioned in the folded position.

A pair of feet 30 is provided and each of the feet 30 is coupled to the first end 26 of an associated one of the second legs 24. Each of the feet 30 frictionally engages the support surface 14 when the stand 12 is in the unfolded position. A handle 32 is coupled to and extends upwardly from the first end 26 of the second legs 24. The handle 32 gripped to roll the stand 12 along the support surface 14 when the stand 12 is in the folded position. The handle 32 may include a central member extending between a pair of outward members. Each of the outward members may be coupled to the associated second leg 24 and the central member may be gripped.

A table 34 is coupled to the stand 12 and the table 34 is spaced from the support surface 14 when the stand 12 is positioned in the unfolded position. A miter saw 36 is included and the miter saw 36 is removably positioned on the table 34. The miter saw 36 has a cutting length of at least 24.0 inches and the miter saw 36 may be an electric miter saw or an electric compound miter saw. Each of the stand 12 and the table 34 may be elements of existing saw tables to include, but not be limited to, table saws and miter saws. The table 34 has a top surface 40, a bottom surface 42 and a peripheral edge 44 extending therebetween. The peripheral edge 44 has a first lateral side 46 and a second lateral side 48. Additionally, the second end 20,28 corresponding to each of the first 16 and second 24 legs is movably coupled to the bottom surface 42.

The table 34 has a pair of first chambers 50 that are each positioned between the top 40 and bottom 42 surfaces. Each of the first chambers 50 extends through the first lateral side 46 and the first chambers 50 are spaced apart from each other. The table 34 has a pair of second chambers 52 each positioned between the top 40 and bottom 42 surfaces. Each of the second chambers 52 extends through the second lateral side 48 and the second chambers 52 are spaced apart from each other.

A pair of extension units 54 is provided and each of the extension units 54 is movably coupled to the table 34. Each of the extension units 54 is selectively positioned in a deployed position having each of the extension units 54 being laterally spaced from the table 34. In this way the pair of extension units 54 may support a member 38 that is too long for the table 34 to support. Additionally, each of extension units 54 has a width of at least 24.0 inches and each of the extension units 54 is selectively positioned in a stored position. The pair of extension units 54 includes a first extension unit 56 and a second extension unit 58.

Each of the first 56 and second 58 extension units includes all of the elements disclosed henceforth, including a pair of arms 60 that each has a primary end 62. Each of the arms 60 corresponding to the first extension unit 56 is slidably positioned in an associated one of the first chambers 50. Moreover, the primary end 62 corresponding to the first extension unit 56 is spaced from the first lateral side 46 of the table 34. Each of the arms 60 corresponding to the second extension unit 58 is slidably positioned in an associated one of the second chambers 52. The primary end 62 corresponding to the second extension unit 58 is spaced from the second lateral side 48 of the table 34.

A panel 66 is provided that has an upper surface 68, a lower surface 70 and a perimeter edge 72 extending therebetween, and the perimeter edge 72 has a first side 74. A pair of tracks 76 is provided and each of the tracks 76 has a first end 78. Each of the tracks 76 is coupled to the lower surface 70 of the panel 66 and the first end 78 of each of the tracks 76 is aligned with the first side 74 of the panel 66. The first end 78 of the tracks 76 corresponding to the first extension unit 56 is hingedly coupled to the primary end 62 of an associated one of the arms 60 corresponding to the first extension unit 56. Additionally, the first end 78 of the tracks 76 corresponding to the second extension unit 58 is hingedly coupled to the primary end 62 of an associated one of the arms 60 corresponding to the second extension unit 58.

The first side 74 of the panel 66 is spaced from the peripheral edge 44 of the table 34 when the extension units 54 are positioned in the deployed position. Each of the tracks 76 includes a pair of legs 76A and feet 76B. The feet corresponding to each of the tracks 76 is spaced from the lower surface 70. A plurality of stops 84 is provided and each of the stops 84 is positioned in an associated one of the first 50 and second 52 chambers. Each of the stops 84 is aligned with an associated one of the first 46 and second 48 lateral sides of the panel 66. Moreover, each of the arms 60 engages an associated one of the stops 84 to inhibit the arms 60 from being removed from the panel 66. Each of the table 34 and the panel 66 may have a depth of at least 60.0 cm thereby facilitating the saw 36 to make a 63.0 cm diagonal cut.

A pair of locks 86 is each slidably coupled to an associated one of the tracks 76 and the each of the locks 86 is selectively manipulated. Each of the locks 86 includes a slide 88 and a tab 90 extending downwardly from the slide 88. The slide 88 is positioned between the feet corresponding to the associated track 76 and the lower surface 70 of the panel 66. Each of the locks 86 is selectively positioned in a deployed position having the slide 88 corresponding to each of the locks 86 extending beneath and engaging each of the arms 60. In this way the panel 66 is inhibited from hinging downwardly on the arms 60 thereby facilitating the panel 66 to support the member 38 for cutting. Each of the locks 86 is selectively positioned in an unlocking position having the slide 88 corresponding to each of the locks 86 being fully positioned beneath the panel 66. Thus, the panel 66 may hinge downwardly on the arms 60.

In use, the stand 12 is positioned in the unfolded position and the saw 36 is coupled to the table 34. The panel 66 corresponding to each of the extension units 54 is selectively urged upwardly on the corresponding arms 60. Additionally, the panel 66 corresponding to each of the extension units 54 is selectively urged laterally away from the table 34. Thus, the arms 60 corresponding to each of the extension units 54 is drawn outwardly from the associated first 50 and second 52 chambers. The locks 86 corresponding to each of the extension units 54 is urged into the locked position. In this way the panel 66 corresponding to each of the extension units 54 is retained in a horizontal position to support the member 38. In this way an oversized member 38 may be supported for cutting.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A saw table system, said system comprising:
   a stand being configured to be positioned on a support surface, said stand being selectively positioned between a folded position and an unfolded position; said stand comprising
   a pair of first legs, each of said first legs having a first end and a second end,
   a pair of wheels, each of said wheels being rotatably coupled to said first end of an associated one of said first legs wherein each of said wheels is configured to selectively roll on the support surface, and a pair of second legs, each of said second legs having a first end and a second end, each of said second legs being pivotally coupled to an associated one of said first legs, each of said first legs and said second legs forming an X when said stand is positioned in said unfolded position wherein said second end corresponding to each of said first and second legs is configured to be spaced from the support surface, each of said first legs being oriented to be coextensive with said second legs when said stand is positioned in said folded position;

a table being coupled to said stand wherein said table is configured to be spaced from the support surface when said stand is positioned in said unfolded position, said table having a top surface, a bottom surface and a peripheral edge extending between the top surface and the bottom surface, said peripheral edge having a first lateral side and a second lateral side, said second end corresponding to each of said first and second legs being movably coupled to said bottom surface;

a miter saw being removably positioned on said table wherein said miter saw is configured to cut a member, said miter saw having a cutting length of at least 24.0 inches;

a pair of extension units, each of said extension units being movably coupled to said table, each of said extension units being selectively positioned in a deployed position having each of said extension units being laterally spaced from said table wherein said pair of extension units is configured to support the member when the member is too long for said table to support, each of said extension units being selectively positioned in a stored position, each of said extension units having a width of at least 24.0 inches;

said table has a pair of first chambers being positioned between said top and bottom surfaces, each of said first chambers extending through said first lateral side, said first chambers being spaced apart from each other;

said table has a pair of second chambers each being positioned between said top and bottom surfaces, each of said second chambers extending through said second lateral side, said second chambers being spaced apart from each other;

wherein said pair of extension units includes a first extension unit and a second extension unit, each of said first and second extension units comprising a pair of arms, each of said arms having a primary end, each of said arms corresponding to said first extension unit being slidably positioned in an associated one of said first chambers having said primary ends corresponding to said first extension unit being spaced from said first lateral side of said table in the deployed position, each of said arms corresponding to said second extension unit being slidably positioned in an associated one of said second chambers having said primary ends corresponding to said second extension unit being spaced from said second lateral side of said table in the deployed position;

wherein each of said extension units further comprises:
a panel having an upper surface, a lower surface and a perimeter edge extending between the upper surface and the lower surface, said perimeter edge having a first side, and
a pair of tracks, each of said tracks having a first end, each of said tracks being coupled to said lower surface of said panel, said first end of each of said tracks being aligned with said first side of said panel; and wherein each of said first end of said tracks corresponding to said first extension unit is hingedly coupled to said primary end of an associated one of said arms corresponding to said first extension unit, each of said first end of said tracks corresponding to said second extension unit being hingedly coupled to said primary end of an associated one of said arms corresponding to said second extension unit, each of said first side of each of said panel being spaced from said peripheral edge of said table when said extension units are positioned in said deployed position, each of said tracks including a pair of legs and feet, said feet corresponding to each of said tracks being spaced from said lower surface.

2. The system according to claim 1, further comprising a pair of locks, each of said locks being slidably coupled to an associated one of said tracks wherein said each of said locks is configured to be manipulated, each of said locks being positioned between said feet corresponding to said associated track and said lower surface of an associated one of said panels.

3. The system according to claim 2, wherein each of said locks is selectively positioned in a lock deployed position having each of said locks extending beneath and engaging an associated one of said arms such that said associated one of said panels is inhibited from hinging downwardly.

4. The system according to claim 1, further comprising a pair of stand feet, each of said stand feet being coupled to said first end of an associated one of said second legs wherein each of said stand feet is configured to frictionally engage the support surface.

5. The system according to claim 1, further comprising a handle being coupled to and extending upwardly from said first end of said second legs wherein said handle is configured to be gripped thereby facilitating said stand to be rolled along the support surface when said stand is in said folded position.

6. The system according to claim 1, further comprising a plurality of stops, each of said stops being positioned in an associated one of said first and second chambers, each of said stops being aligned with an associated one of said first and second lateral sides of said table, each of said arms engaging an associated one of said stops to inhibit said arms from being removed from said table.

7. A saw table system comprising:
a stand being configured to be positioned on a support surface, said stand being selectively positioned between a folded position and an unfolded position, said stand comprising:
a pair of first legs, each of said first legs having a first end and a second end,
a pair of wheels, each of said wheels being rotatably coupled to said first end of an associated one of said first legs wherein each of said wheels is configured to selectively roll on the support surface,
a pair of second legs, each of said second legs having a first end and a second end, each of said second legs being pivotally coupled to an associated one of said first legs, each of said first legs and said second legs forming an X when said stand is positioned in said unfolded position wherein said second end corresponding to each of said first and second legs is configured to be spaced from the support surface, each of said first legs being oriented to be coextensive with said second legs when said stand is positioned in said folded position, a pair of feet, each of said feet being coupled to said first end of an associated one of said second legs wherein each of said feet is configured to frictionally engage the support surface, and a handle being coupled to and extending upwardly from said first end of said second legs wherein said handle is configured to be gripped thereby facilitating said stand to be rolled along the support surface when said stand is in said folded position;

a table being coupled to said stand wherein said table is configured to be spaced from the support surface when said stand is positioned in said unfolded position, said table having a top surface, a bottom surface and a peripheral edge extending between the top surface and the bottom surface, said peripheral edge having a first lateral side and a second lateral side, said second end corresponding to each of said first and second legs being movably coupled to said bottom surface, said table having a pair of first chambers being positioned between said top and bottom surfaces, each of said first chambers extending through said first lateral side, said first chambers being spaced apart from each other, said table having a pair of second chambers each being positioned between said top and bottom surfaces, each of said second chambers extending through said second lateral side, said second chambers being spaced apart from each other;

a miter saw being removably positioned on said table wherein said miter saw is configured to cut a member, said miter saw having a cutting length of at least 24.0 inches; and a pair of extension units, each of said extension units being movably coupled to said table, each of said extension units being selectively positioned in a deployed position having each of said extension units being laterally spaced from said table wherein said pair of extension units is configured to support the member when the member is too long for said table to support, each of said extension units being selectively positioned in a stored position, each of said extension units have a width of at least 24.0 inches, said pair of extension units including a first extension unit and a second extension unit, each of said first and second extension units comprising:

a pair of arms, each of said arms having a primary end, each of said arms corresponding to said first extension unit being slidably positioned in an associated one of said first chambers having said primary ends corresponding to said first extension unit being spaced from said first lateral side of said table in the deployed position, each of said arms corresponding to said second extension unit being slidably positioned in an associated one of said second chambers having said primary ends corresponding to said second extension unit being spaced from said second lateral side of said gable in the deployed position, a panel having an upper surface, a lower surface and a perimeter edge extending between the upper surface and the lower surface, said perimeter edge having a first side, a pair of tracks, each of said tracks having a first end, each of said tracks being coupled to said lower surface of said panel, said first end of each of said tracks being aligned with said first side of said panel, each of said first end of said tracks corresponding to said first extension unit being hingedly coupled to said primary end of an associated one of said arms corresponding to said first extension unit, each of said first end of said tracks corresponding to said second extension unit being hingedly coupled to said primary end of an associated one of said arms corresponding to said second extension unit, said first side of said panel being spaced from said peripheral edge of said table when said extension units are positioned in said deployed position, each of said tracks including a pair of legs and feet, said feet corresponding to each of said tracks being spaced from said lower surface, a plurality of stops, each of said stops being positioned in an associated one of said first and second chambers, each of said stops being aligned with an associated one of said first and second lateral sides of said table, each of said arms engaging an associated one of said stops to inhibit said arms from being removed from said table, and a pair of locks, each of said locks being slidably coupled to an associated one of said tracks wherein said each of said locks is configured to be manipulated, each of said locks being positioned between said feet corresponding to said associated track and said lower surface of said panel, each of said locks being selectively positioned in a lock deployed position having each of said locks extending beneath and engaging an associated one of said arms such that said panel is inhibited from hinging downwardly on said arms wherein said panel is configured to support the member for cutting.

* * * * *